United States Patent
Stevenson et al.

(10) Patent No.: US 11,067,003 B2
(45) Date of Patent: Jul. 20, 2021

(54) FLUID COOLING STRUCTURE FOR AN ELECTRIC MACHINE OF A GAS TURBINE ENGINE

(71) Applicant: General Electric Company, Schenectady, NY (US)

(72) Inventors: Christian Xavier Stevenson, Blanchester, OH (US); Nathan Evan McCurdy Gibson, West Chester, OH (US); Sean Christopher Binion, Loveland, OH (US); Patrick Michael Marrinan, Mason, OH (US)

(73) Assignee: General Electric Company, Schenectady, NY (US)

( * ) Notice: Subject to any disclaimer, the term of this patent is extended or adjusted under 35 U.S.C. 154(b) by 502 days.

(21) Appl. No.: 15/719,959

(22) Filed: Sep. 29, 2017

(65) Prior Publication Data
US 2019/0101057 A1    Apr. 4, 2019

(51) Int. Cl.
| F02C 7/16 | (2006.01) |
| F02C 7/32 | (2006.01) |
| H02K 5/20 | (2006.01) |
| H02K 9/16 | (2006.01) |
| H02K 9/19 | (2006.01) |
| H02K 7/18 | (2006.01) |
| F02C 6/20 | (2006.01) |
| F01D 15/10 | (2006.01) |

(52) U.S. Cl.
CPC ............... *F02C 7/32* (2013.01); *F01D 15/10* (2013.01); *F02C 6/206* (2013.01); *F02C 7/16* (2013.01); *H02K 5/20* (2013.01); *H02K 7/1823* (2013.01); *H02K 9/16* (2013.01); *H02K 9/19* (2013.01); *F05D 2220/76* (2013.01); *F05D 2260/20* (2013.01); *F05D 2260/205* (2013.01)

(58) Field of Classification Search
CPC ... H02K 9/19; H02K 9/00; H02K 9/14; F01D 15/10; F01D 25/18; F02C 7/26; F01P 11/08; F01M 11/02; F01M 5/002
See application file for complete search history.

(56) References Cited

U.S. PATENT DOCUMENTS

| 6,651,929 B2 | 11/2003 | Dionne |
| 6,657,332 B2 | 12/2003 | Balas |
| 6,881,027 B2 | 4/2005 | Klaass et al. |
| 6,942,181 B2 | 9/2005 | Dionne |
| 7,124,588 B2 | 10/2006 | Gerendas et al. |
| 7,251,942 B2 | 8/2007 | Dittmar et al. |
| 7,337,605 B2 | 3/2008 | Hagshenas |
| 7,364,117 B2 | 4/2008 | Dionne |
| 7,540,142 B2 | 6/2009 | Sheoran et al. |
| 8,310,076 B2 | 11/2012 | Jones et al. |
| 9,205,926 B2 | 12/2015 | Ouplomb |

(Continued)

*Primary Examiner* — Gerald L Sung
*Assistant Examiner* — Alyson Joan Harrington
(74) *Attorney, Agent, or Firm* — Dority & Manning, P.A.

(57) ABSTRACT

The present disclosure is directed to a gas turbine engine including a housing circumferentially surrounding an electric machine. The electric machine is supported within the housing. The housing defines a cooling passage proximate to the electric machine. The cooling passage circumferentially surrounds the electric machine and is extended at least partially along a lengthwise direction of the electric machine. The cooling passage provides a flow of fluid therethrough.

20 Claims, 10 Drawing Sheets

(56) References Cited

U.S. PATENT DOCUMENTS

| | | | |
|---|---|---|---|
| 2003/0222519 A1* | 12/2003 | Bostwick | H02K 5/20 |
| | | | 310/58 |
| 2006/0108807 A1* | 5/2006 | Bouiller | F01D 15/10 |
| | | | 290/52 |
| 2009/0302152 A1 | 12/2009 | Knight | |
| 2012/0025676 A1* | 2/2012 | Poisson | F01D 15/10 |
| | | | 310/67 R |
| 2016/0341128 A1 | 11/2016 | Juarez Becerril et al. | |
| 2017/0335770 A1* | 11/2017 | Glahn | F02C 7/14 |
| 2019/0010824 A1* | 1/2019 | Snyder | H02K 5/20 |

* cited by examiner

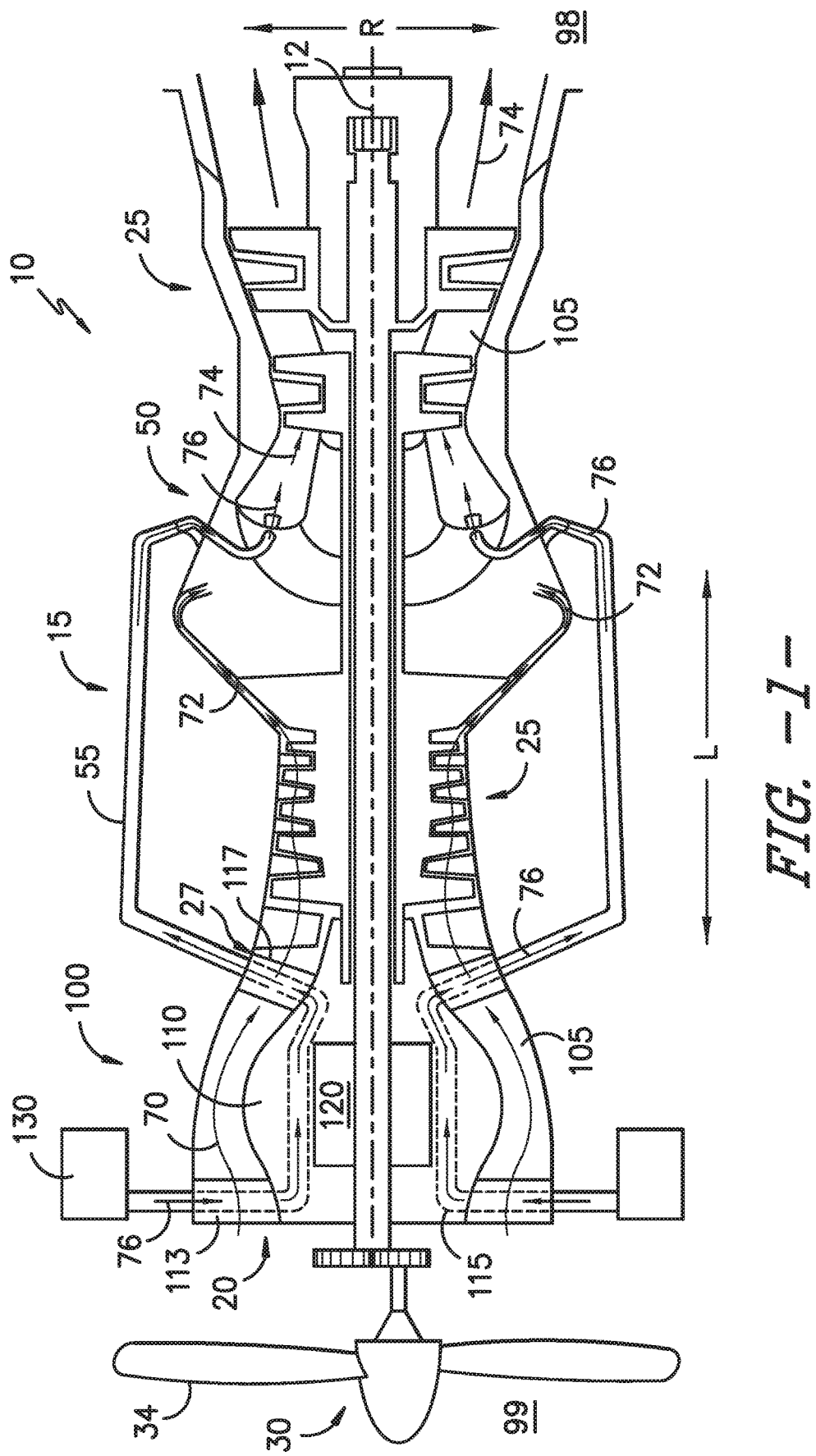
FIG. -1-

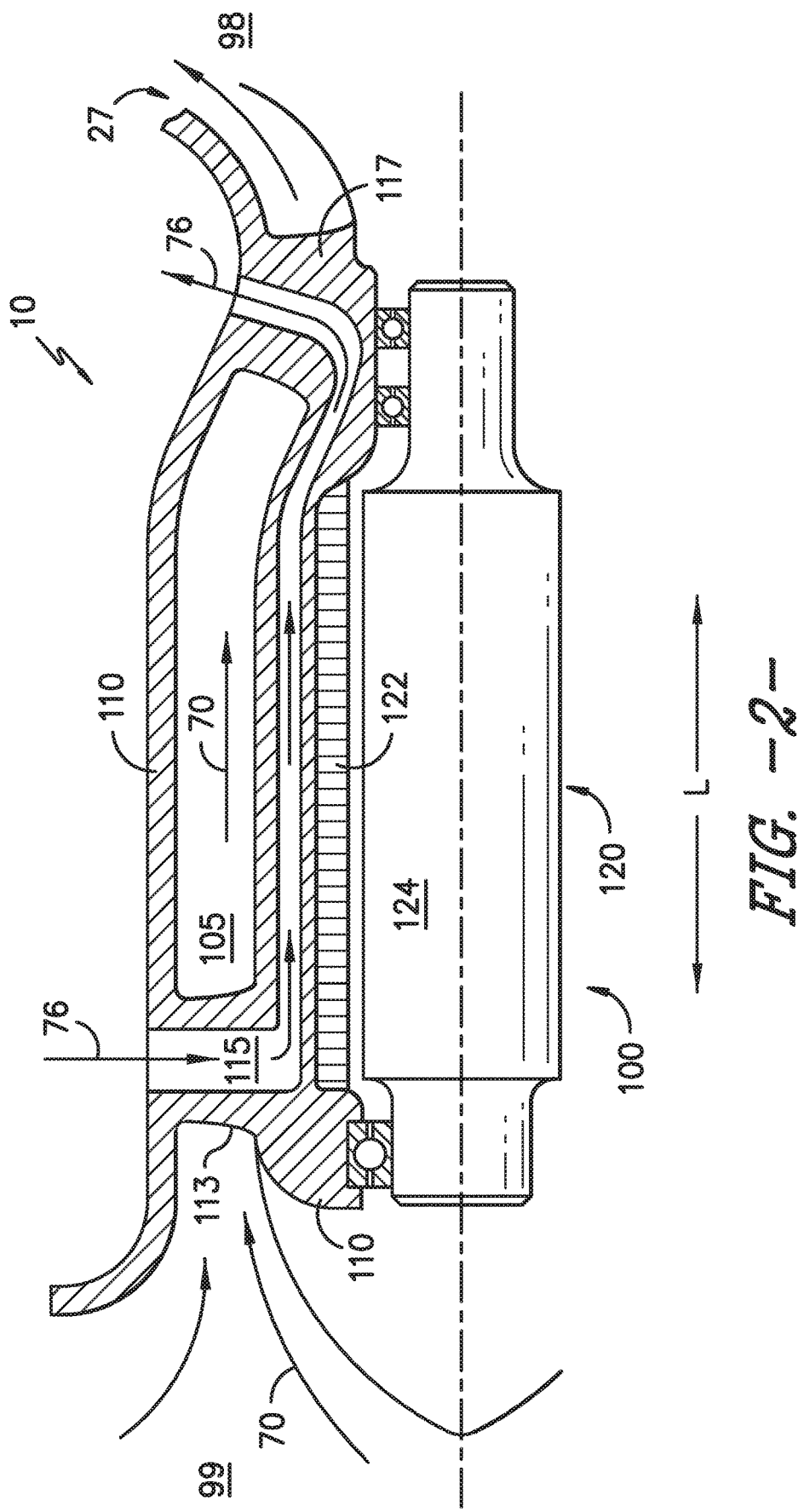

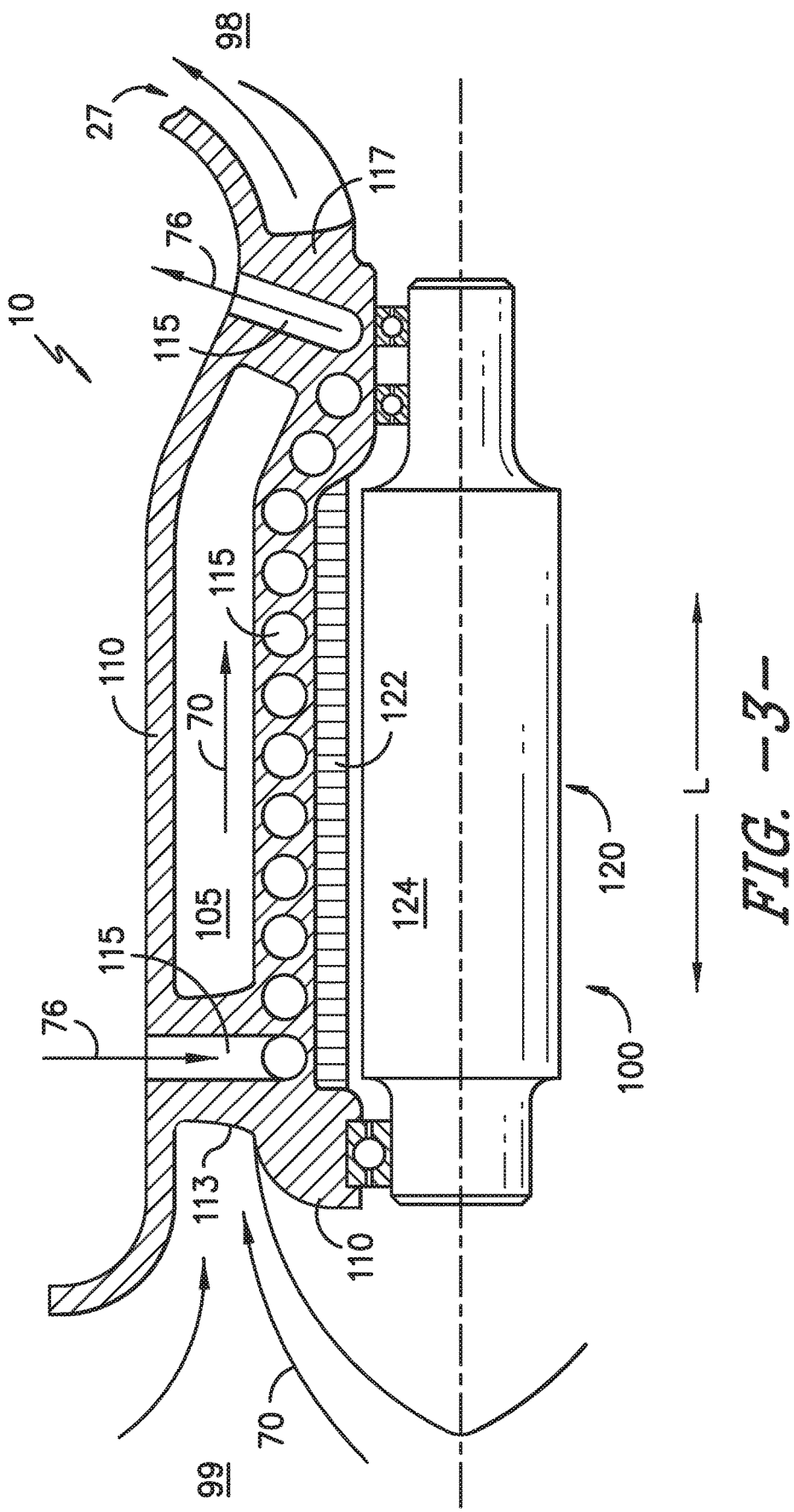
FIG. -3-

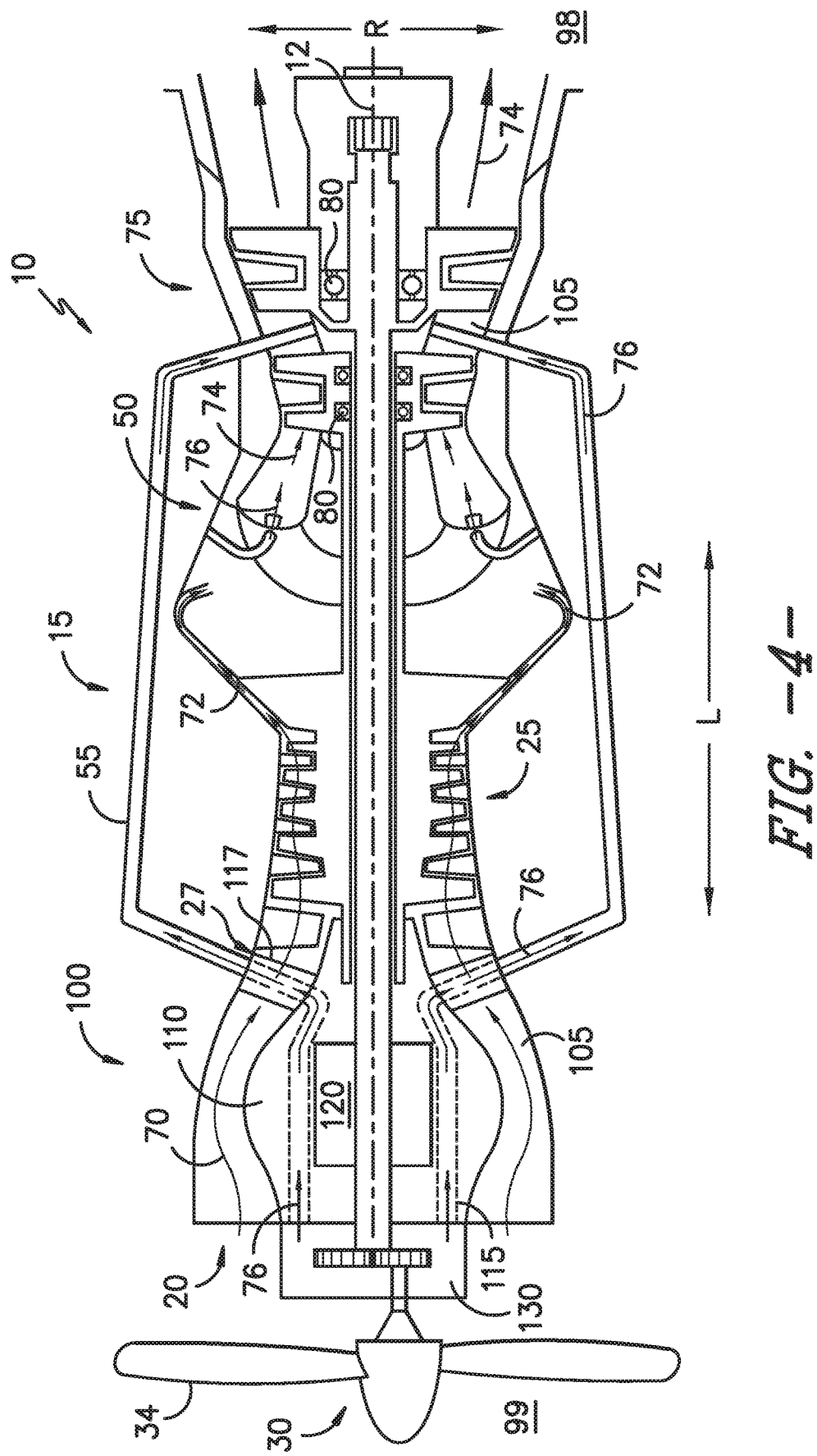
FIG. -4-

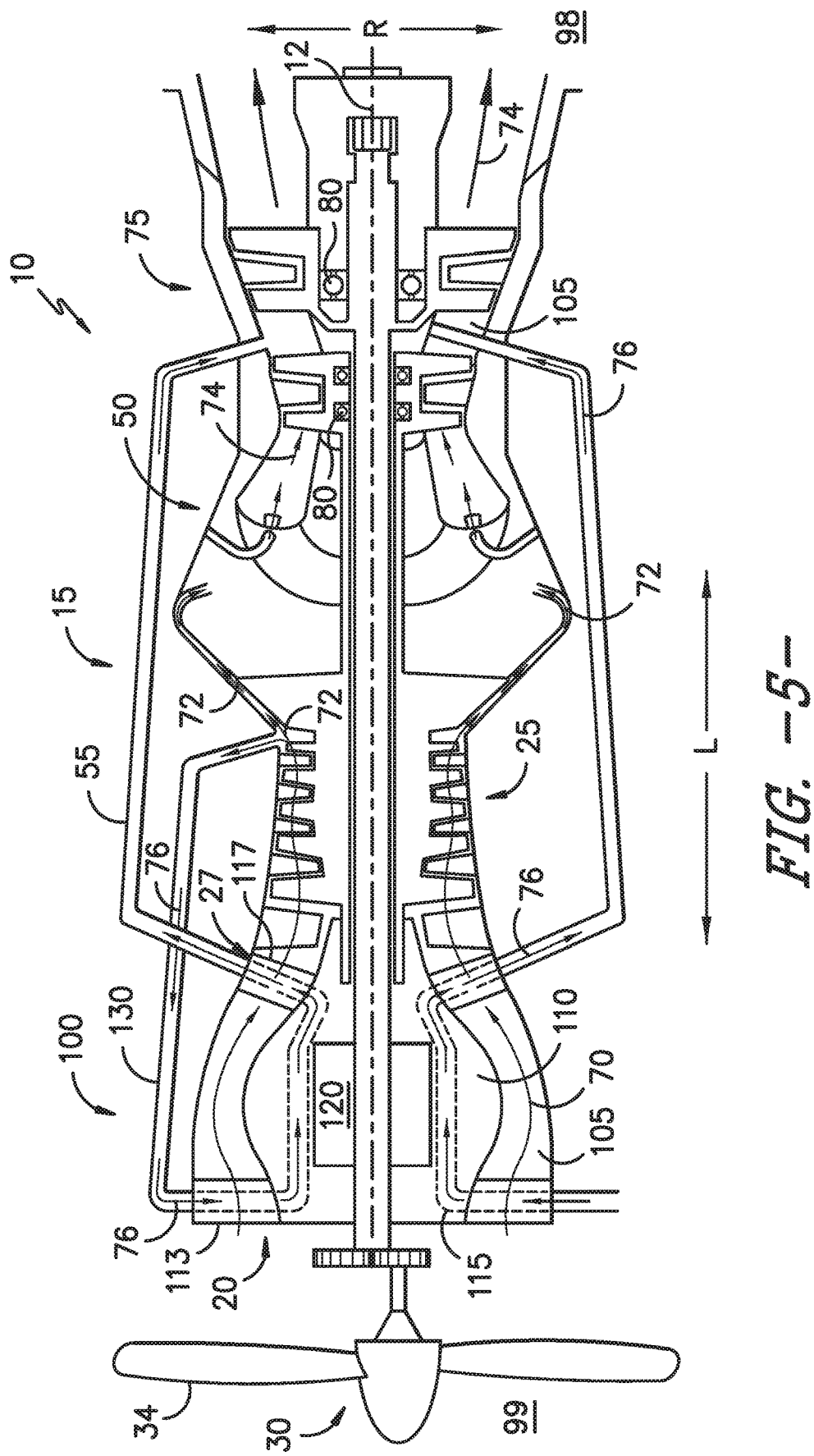
FIG. -5-

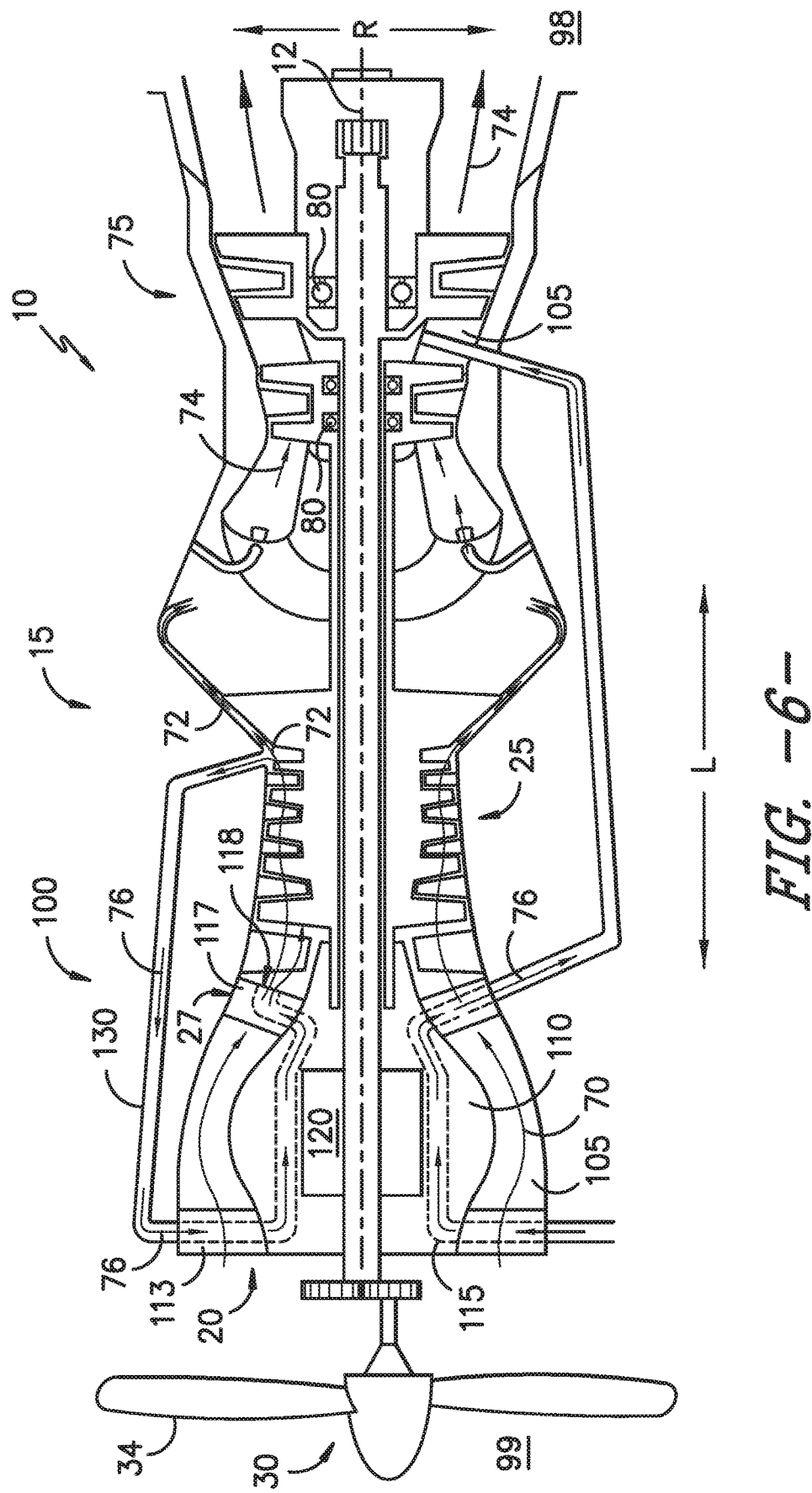
FIG. -6-

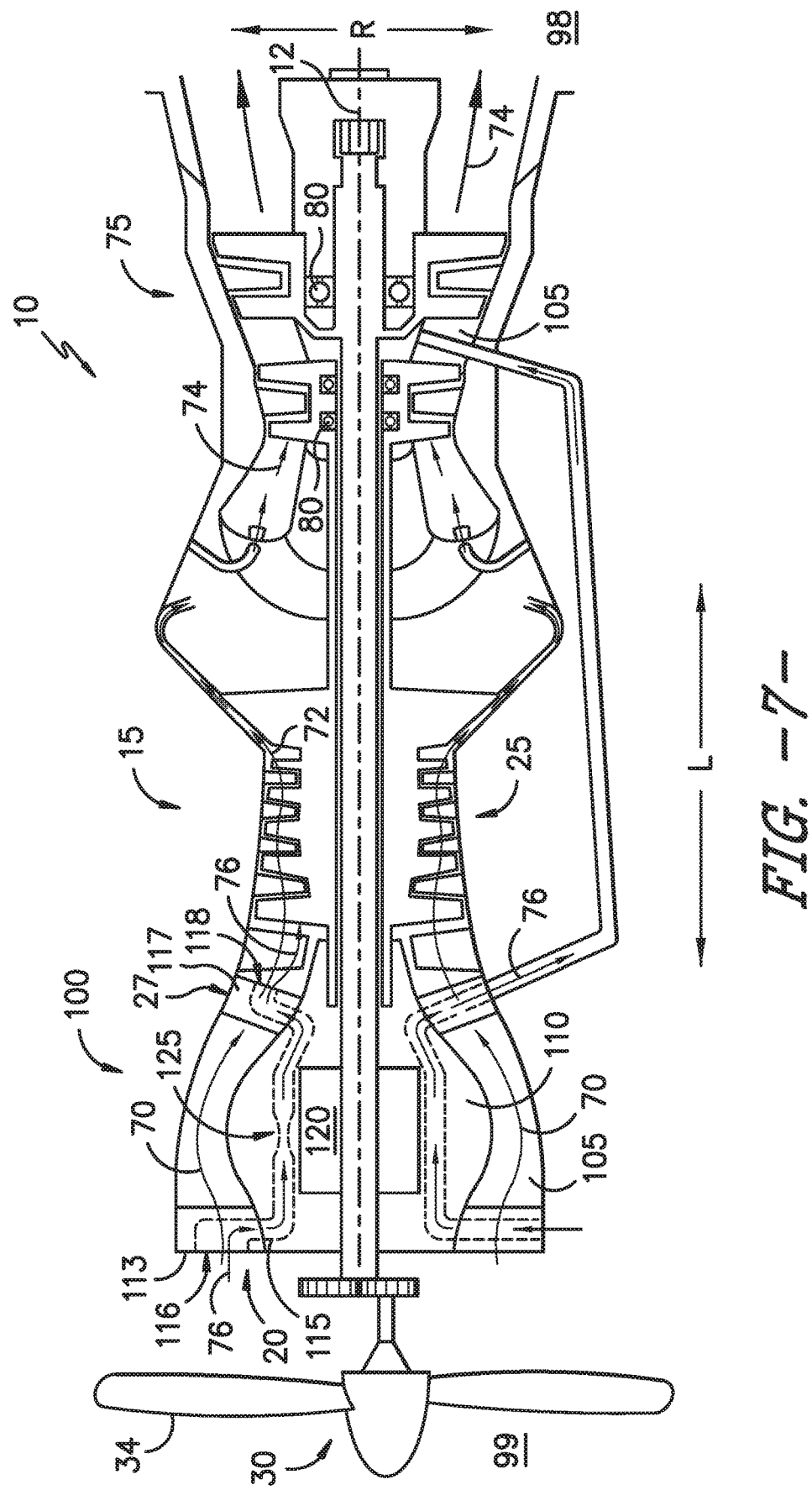

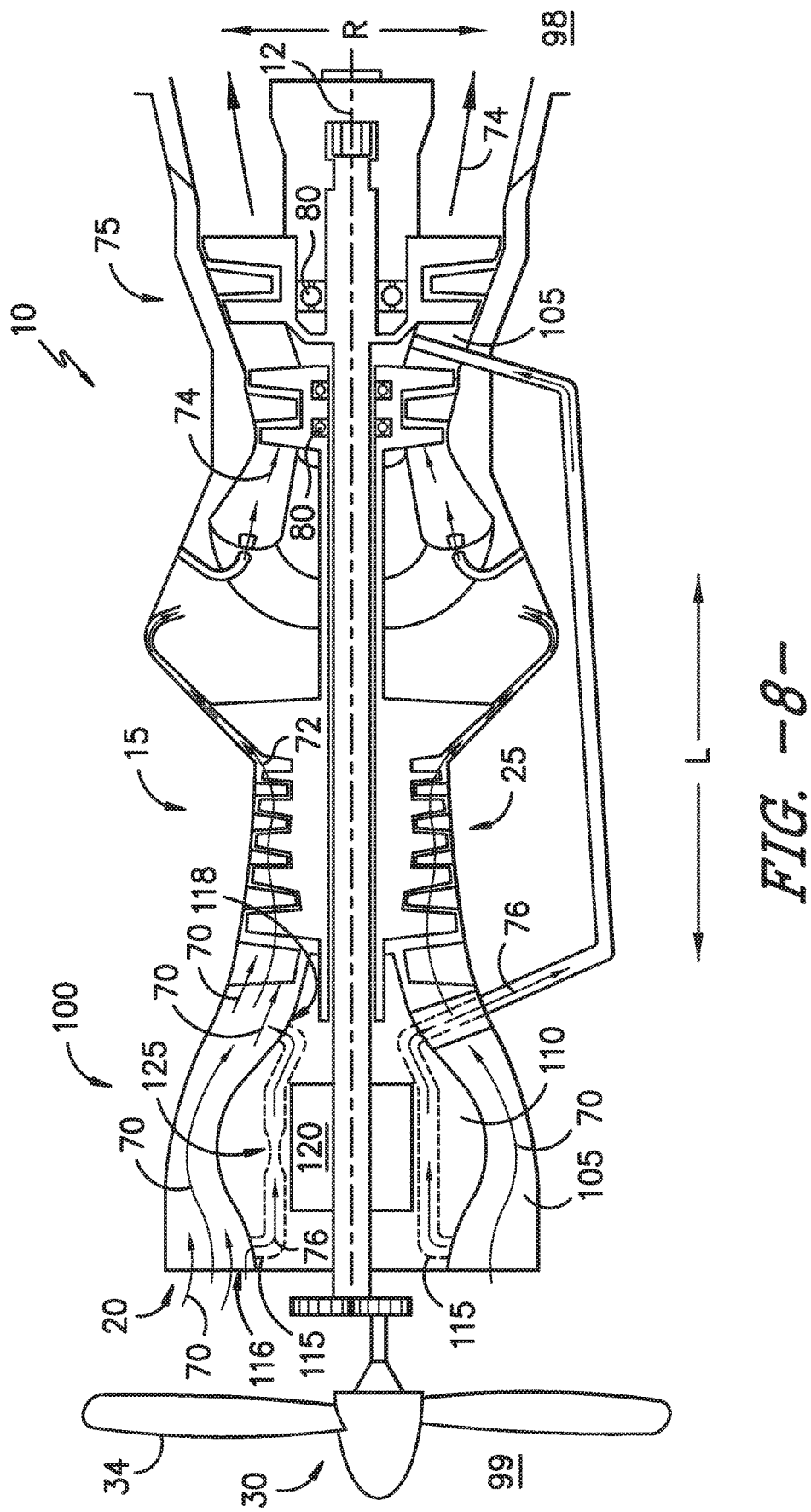
FIG. -8-

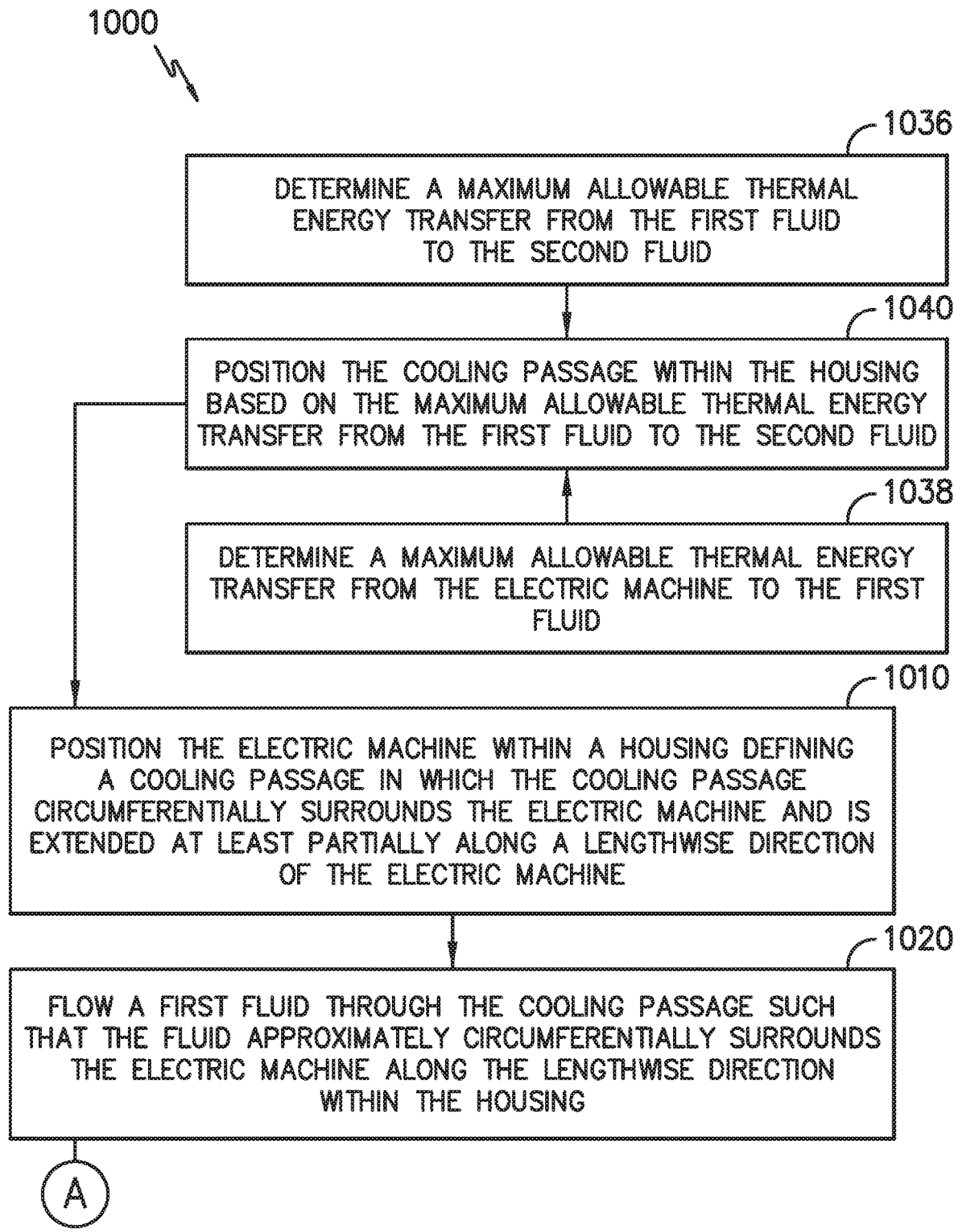
FIG. -9A-

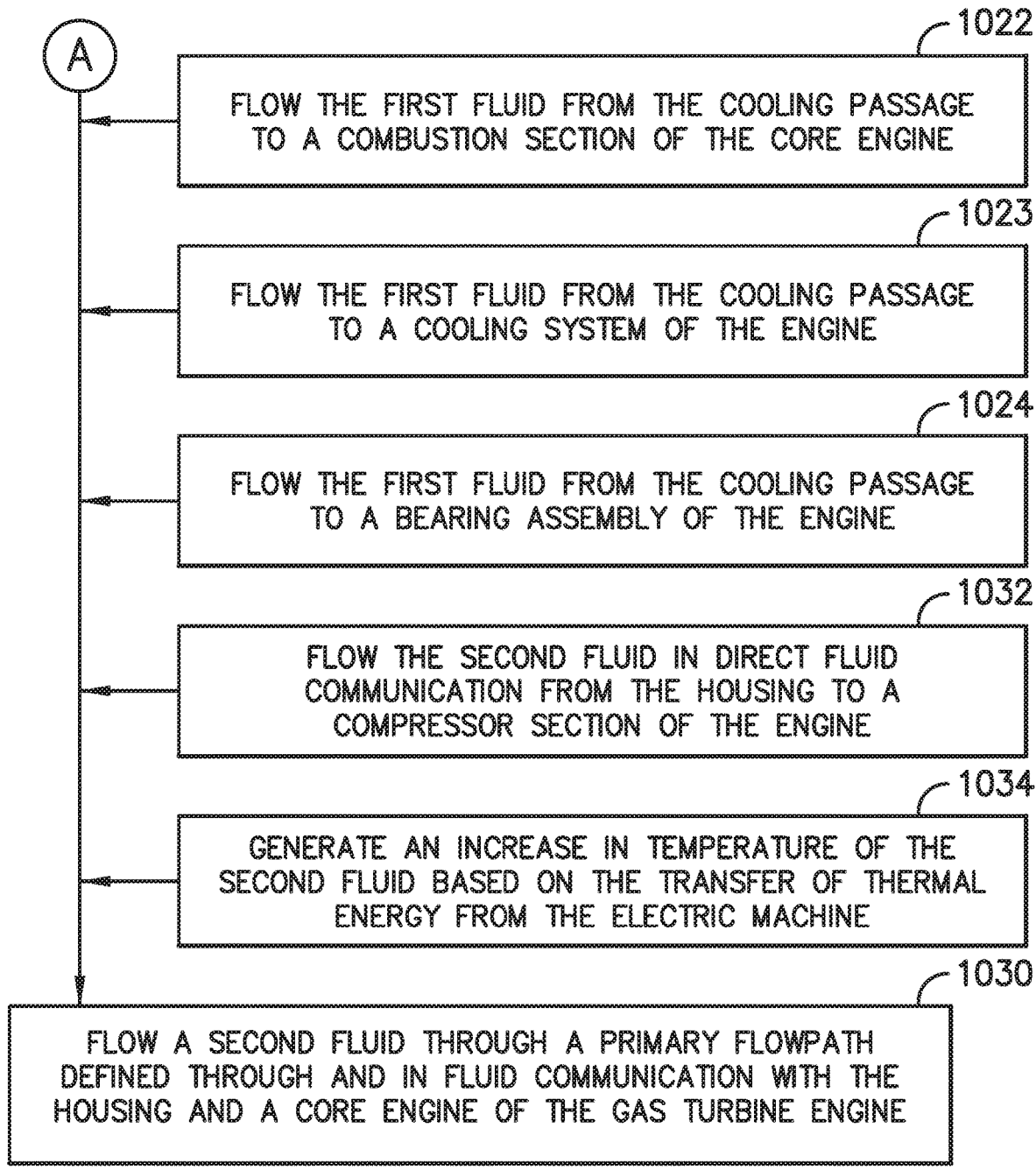
FIG. -9B-

FLUID COOLING STRUCTURE FOR AN ELECTRIC MACHINE OF A GAS TURBINE ENGINE

FIELD

The present subject matter relates generally to gas turbine engines including electric machines. More specifically, the present subject matter relates to thermal structures for electric machine assemblies and gas turbine engines.

BACKGROUND

Gas turbine engines generally include electric machines such as starter motors, generators, or electronics units used to provide an initial rotation of the engine for startup as well as power for engine electrical systems. During operation of the generator, inefficiency and performance losses are manifested at the generator as heating of the generator windings and structure. To mitigate such losses, fluid cooling, such as air or fuel, may be utilized to remove thermal energy from the generator.

However, known fluid cooling solutions generally penalize gas turbine engine efficiency, such as by heating inlet air to the compressor, removing compressed air from the combustion thermodynamic cycle, or adding heat exchangers to remove heat from the air, thereby increasing engine size and weight and otherwise penalizing engine efficiency and performance. Known fluid cooling solutions utilizing fuel often include structures subject to leakage, such as joints, fasteners, and other members.

As such, there is a need for a fluid cooling structure for an electric machine of a gas turbine engine that provides electric machine cooling while mitigating adverse effects to gas turbine engine efficiency and performance.

BRIEF DESCRIPTION

Aspects and advantages of the invention will be set forth in part in the following description, or may be obvious from the description, or may be learned through practice of the invention.

The present disclosure is directed to a gas turbine engine including a housing circumferentially surrounding an electric machine. The electric machine is supported within the housing. The housing defines a cooling passage proximate to the electric machine. The cooling passage circumferentially surrounds the electric machine and is extended at least partially along a lengthwise direction of the electric machine. The cooling passage provides a flow of fluid therethrough.

In one embodiment, the cooling passage defines a circumferential passage extended at least approximately circumferentially around the electric machine at an upstream end and at a downstream. The cooling passage defines an axial passage extended between each circumferential passage.

In another embodiment, the cooling passage defines a circumferential passage extended along the lengthwise direction to define a helix surrounding the electric machine along the lengthwise direction and the circumferential direction.

In various embodiments, the housing defines a primary flowpath in fluid communication with a core engine, the primary flowpath at least partially circumferentially surrounding the electric machine, and primary flowpath is disposed outward along the radial direction of the cooling passage. The primary flowpath is extended along the lengthwise direction of the housing and the electric machine. In one embodiment, the primary flowpath is defined through the housing and the core engine comprising a compressor section, a combustion section, and a turbine section in serial flow arrangement. The flow of fluid through the primary flowpath at the housing and the core engine is in thermal communication with the electric machine.

In another embodiment, the cooling passage is defined as a plurality of axial passages in adjacent circumferential arrangement around the electric machine. Each axial passage is extended along the lengthwise direction.

In various embodiments, the housing defines a first strut and a second strut, wherein each of the first strut and the second strut is extended at least partially along a radial direction outward of the electric machine. The cooling passage is extended through the first strut and the second strut. In one embodiment, the first strut defines an inlet opening in fluid communication with the cooling passage through which a portion of a flow of air enters the cooling passage. In another embodiment, the second strut defines an exit opening in fluid communication with the cooling passage. In one embodiment, the exit opening is further in fluid communication with the primary flowpath. The flow of fluid through the cooling passage flows into the primary flowpath.

In still various embodiments, the engine further includes a fluid system providing a flow of fluid to the cooling passage. The fluid system is in fluid communication with the first strut providing a flow of fluid therethrough to the cooling passage. In various embodiments, the engine further includes a conduit extended from the second strut in fluid communication with the cooling passage. In one embodiment, the conduit is further coupled to the combustor assembly in fluid communication with the cooling passage, the conduit providing the flow of fluid from the cooling passage to the combustor assembly. In another embodiment, the conduit is further coupled to the turbine section in fluid communication with the cooling passage, the conduit providing the flow of fluid from the cooling passage to the turbine section. In still another embodiment, the fluid system is coupled to the compressor section in fluid communication with a primary flowpath, and wherein the fluid system provides the flow of fluid from the primary flowpath to the cooling passage.

In still various embodiments, the flow of fluid is one or more of air, liquid or gaseous fuel, oil, hydraulic fluid, an inert gas, or combinations thereof.

The present disclosure is further directed to a method of fluid cooling for an electric machine of a gas turbine engine. The method includes positioning the electric machine within a housing defining a cooling passage in which the cooling passage circumferentially surrounds the electric machine and is extended at least partially along a lengthwise direction of the electric machine; flowing a first fluid through the cooling passage such that the fluid approximately circumferentially surrounds the electric machine along the lengthwise direction within the housing, wherein flowing the first fluid through the cooling passage transfers thermal energy from the electric machine to the first fluid; and flowing a second fluid through a primary flowpath defined through and in fluid communication with the housing and a core engine of the gas turbine engine, the primary flowpath at least partially circumferentially surrounding the electric machine outward along the radial direction of the cooling passage. Flowing the second fluid through the primary flowpath transfers thermal energy from the first fluid to the second fluid.

In one embodiment, the method further includes flowing the second fluid in direct fluid communication from the housing to a compressor section of the engine.

In another embodiment, the method further includes generating an increase in temperature of the second fluid based on the transfer of thermal energy from the electric machine.

In still another embodiment, the method includes determining a maximum allowable thermal energy transfer from the first fluid to the second fluid based on a maximum allowable air temperature at an inlet of the compressor section at one or more engine operating conditions.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is an axial cross sectional view of an exemplary gas turbine engine incorporating an exemplary embodiment of an electric machine assembly according to an aspect of the present disclosure;

FIG. 2 is an axial cross sectional view of an exemplary embodiment of the electric machine assembly of the gas turbine engine of FIG. 1;

FIG. 3 is another exemplary embodiment of the electric machine assembly of the gas turbine engine of FIG. 1;

FIGS. 4-8 are axial cross sectional views of various exemplary embodiments of a gas turbine incorporating an embodiment of the electric machine assembly generally provided in FIGS. 2-3; and FIGS. 9A and 9B are a flowchart outlining steps of an exemplary method of fluid cooling for an electric machine for a gas turbine engine.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" or "upstream end 99" and "downstream" or "downstream end 98" refer to the relative direction with respect to fluid flow in a fluid pathway. For example, "upstream of" is the spatial disposition of a first object, structure, etc. referenced against a second object, structure, etc. "Upstream toward" refers to the direction toward "upstream end 99" unless otherwise specified. "Downstream of" is the spatial disposition of a first object, structure, etc. referenced against a second object structure, etc. "Downstream toward" refers to the direction toward "downstream end 98" unless otherwise specified. It should be appreciated that flowpaths may define forward, aft, radial, or circumferential flows that ultimately begin and terminate at the upstream end 99 and the downstream end 98 respectively, unless otherwise specified.

Embodiments of an electric machine assembly for a gas turbine engine, and methods of fluid cooling for the electric machine assembly, are generally provided. The structures and methods shown and described herein provide heat transfer generated from operation of the electric machine to a cooling passage defined through the electric machine assembly. The cooling passage is in thermal communication with a fluid of the primary flowpath of the engine, thereby providing a net improvement of engine efficiency via improved efficiency and performance of the electric machine of the gas turbine engine.

Referring now to FIG. 1, an exemplary embodiment of a gas turbine engine 10 (hereinafter "engine 10") is generally provided. The engine 10 defines a lengthwise direction L and a reference centerline axis 12 extended along the lengthwise direction L. A reference radial direction R and circumferential direction C are each extended from the centerline axis 12. Although the engine 10 generally provided may depict a turboshaft or turboprop engine configuration, it should be appreciated that the embodiments of the engine 10 and combustor assembly 50 generally provided herein may be configured as turbofan and turbojet gas turbine engines, as well as auxiliary power units, air turbine starters, land- or marine-based power generation units, or gas turbine engines for land, marine, or air apparatuses, including land and marine vehicles, missile propulsion, and rotary-wing or fixed-wing aircraft.

The engine 10 includes an electric machine assembly 100, a compressor section 25, a combustor assembly 50, and a turbine section 75 in serial flow arrangement. The compressor section 25, the combustor assembly 50, and the turbine section 75, or at least portions thereof, together define a core engine 15. The electric machine assembly 100 includes a housing 110 circumferentially surrounding and supporting an electric machine 120. Referring now to FIG. 2, in addition to FIG. 1, the electric machine 120 includes a stator component 122 and a rotor component 124, together of which define a generator (e.g., a permanent magnet generator), motor, starter, electronics unit, electronic controller, etc. In various embodiments, the electric machine 120 provides energy to initially drive the compressor section 25 and turbine section 75 to feed air to the combustor assembly 50 for startup/ignition. The electric machine 120 may further provide energy to one or more auxiliary systems, including computer devices or controllers, pumps, hydro- or pneumatic actuators, environmental control systems, thermal management systems, or lighting systems of the engine 10 and surrounding apparatus (e.g., aircraft).

In the embodiment generally provided in FIG. 1, the electric machine assembly 100 including the housing 110 and electric machine 120 are arranged upstream of the compressor section 25. For example, the housing 110 defines an inlet casing disposed generally around the centerline axis 12 and directing a flow of air 70 through an engine inlet 20 into a core or primary flowpath 105 in fluid communication with the core engine 15. The primary flowpath 105 of the engine 10 is defined generally through the housing 110, the compressor section 25, the combustor assembly 50, and the turbine section 75. The downstream end of the housing 110 is adjacent to a compressor inlet 27 at the primary flowpath 105 of the compressor section 25. As such, the engine inlet 20 at the housing 110 and the compressor inlet 27 at a downstream end of the housing 110 interfacing with the compressor section 25 are in direct fluid communication.

During operation of the engine 10, the flow of air 70 enters through the engine inlet 20 into the primary flowpath 105 at the housing 110. The air 70 flows through the compressor inlet 27 into the compressor section 25, in which the air 70 is progressively compressed, such as shown schematically at arrows 72. The compressed air 72 flows into the combustor assembly 50, at which the compressed air 72 is mixed with a liquid or gaseous fuel and ignited to yield combustion gases 74. The combustion gases 74 flow from the combustor assembly 50 across the primary flowpath 105 at the turbine section 75. As the combustion gases 74 expand through the turbine section 75, energy from the combustion gases 74 promote rotation of turbine rotors in the turbine section 75 that are coupled via a driveshaft to one or more compressors at the compressor section 25 and a fan or propeller assembly 30. The fan or propeller assembly 30 including fan or propeller blades 34 then generates thrust, output horsepower, lift, or other force to move or provide energy to a surrounding apparatus (e.g., a fixed or rotary wing aircraft, an auxiliary power unit, a marine or industrial power unit, etc.).

As the flow of air 70 passes through the primary flowpath 105 defined through the housing 110 in proximity to the electric machine 120, the flow of air 70 provides thermal attenuation (e.g., heat transfer, cooling) of the electric machine 120 via the flow of air 70. More specifically, during operation of the engine 10, the electric machine 120 generates thermal energy. The flow of air 70 through the housing 110 provides convective cooling of the electric machine assembly 100 including the housing 110 and the electric machine 120. The flow of air 70 provides cooling by transferring the thermal energy generated from the electric machine 120 to the flow of air 70 in the primary flowpath 105. The flow of air 70 then egresses from the housing 110 to the core engine 15.

The arrangement of the electric machine assembly 100 and core engine 15 generally provided may improve gas turbine engine 10 efficiency by providing cooling to the electric machine assembly 100 while simplifying the cooling structure and arrangement relative to the core engine 15. For example, although adding thermal energy to the flow of air 70 entering the compressor section 25 may generally reduce efficiency of the core engine 15, the arrangement of the electric machine assembly 100 relative to the core engine 15 to provide cooling to the electric machine 120 may provide efficiency improvements greater than efficiency losses to the core engine 15. Furthermore, the arrangement described herein may further simplify a cooling structure or system of the electric machine 120, such as by obviating the need for heat exchangers, recuperators, or other systems to remove thermal energy from the flow of air 70 prior to entering the compressor section 25. As such, the embodiments of the engine 10 generally provided herein enable direct fluid communication of the flow of air 70 from the primary flowpath 105 defined at the electric machine assembly 100 to the compressor section 25.

Referring back to FIG. 2, the engine 10 defines a cooling passage 115 circumferentially surrounding the electric machine 120 and extended at least partially along a lengthwise direction L of the electric machine 120. A flow of fluid is provided through the cooling passage 115. For example, the fluid is a liquid or gaseous fluid generally utilized for gas turbine engine cooling, such as, but not limited to, air, oil, fuel, or hydraulic fluid. In still various embodiments, the fluid may be a refrigerant or an inert gas.

Referring still to FIG. 2, in one embodiment, the cooling passage 115 defines a passage extended circumferentially at least partially around the electric machine 120 at an upstream end 99 and a downstream end 98. For example, the cooling passage 115 may define a plurality of discrete passages in circumferential arrangement along around the centerline axis 12, in which each cooling passage 115 is in adjacent arrangement of one another along the circumferential direction C.

Referring now to FIG. 3, the embodiment depicted is configured generally similar to the embodiment shown and described in regard to FIG. 2. However, in FIG. 3, the cooling passage 115 defines a circumferential passage extended along the lengthwise direction L to define a helix surrounding the electric machine 120 along the lengthwise direction L and the circumferential direction C. For example, as generally provided in FIG. 3, the cooling passage 115 defines a plurality of cross sectional areas in adjacent arrangement along the lengthwise direction L in fluid communication from the upstream end 99 to the downstream end 98. In one embodiment, the cooling passage 115 may define a helix angle that may vary heat transfer effectiveness along the lengthwise direction L. For example, the helix angle of the cooling passage 115 may define a quantity of turns per unit of length along the lengthwise direction L. As such, the cooling passage 115 may promote or limit heat transfer at various portions along the lengthwise direction L relative to the electric machine 120.

Although generally shown as a circular cross sectional area, the cooling passage 115 may further define an ovular or racetrack, polygonal, or oblong cross sectional area. Still further, the cooling passage 115 may define a variable cross sectional area along the upstream end 99 to the downstream end 98. For example, the cooling passage 115 may define an increasing or decreasing cross sectional area correlating to a determined rise in temperature of a fluid 76 through the cooling passage 115 relative to the electric machine 120.

In various embodiments, the cooling passage 115 may further define a varying cross sectional area based on varying heat transfer coefficients. For example, the cooling passage 115 may be configured to limit heat transfer by decreasing the heat transfer coefficient proximate to portions of the electric machine 120 more structurally robust than others. Alternatively, the cooling passage 115 may be configured to promote heat transfer by increasing the heat transfer coefficient proximate to portions of the electric machine 120 less structurally robust than others, or otherwise more susceptible thermal damage.

In one embodiment, varying the heat transfer coefficient may include defining turbulators, fins, vanes, or other features, or varying quantities thereof, within the cooling passage 115 to adjust the heat transfer rate at one or more areas of the cooling passage 115 proximate to one or more desired portions of the electric machine 120. In other embodiments, one or more features influencing the heat transfer rate at the cooling passage 115 may be based on a change in temperature of the fluid 76 within the cooling passage 115. For example, as the fluid 76 flows toward the downstream end 98, the fluid 76 may generally increase in temperature. One or more features may promote increased fluid flow proximate to an upstream end of the cooling passage 115 to limit the heat transfer rate to the fluid 76. Furthermore, one or more features may promote decreased fluid flow proximate to a downstream end of the cooling passage 115 to increase the heat transfer rate to the fluid 76.

Referring now to FIGS. 1-3, the housing 110 may further define a first strut 113 and a second strut 117 each extended at least partially along the radial direction R outward of the electric machine 120. The cooling passage 115 may be further defined through the first strut 113 and the second strut 117. Each strut 113, 117 is extended through the primary flowpath 105 from an outer radius of the engine 10 to an inner radius. The housing 110 may define the first strut 113, the second strut 117, or both, as a plurality of struts 113, 117 in an adjacent circumferential arrangement relative to the centerline axis 12. For example, the first strut 113 may define two or more airfoils extended through the primary flowpath 105. The second strut 117 may define two or more airfoils extended through the primary flowpath 105.

In various embodiments, the engine 10 further includes a fluid system 130. The fluid system 130 may define one or more of a fuel system, an oil or lube system, a hydraulic fluid system, or a pneumatic fluid system providing a flow of fluid, shown schematically by arrows 76, to the cooling passage 115 and one or more components or systems of the engine 10. For example, referring to FIG. 1, the fluid system 130 may define a fuel system providing a flow of fluid 76 defining a liquid or gaseous fuel to the cooling passage 115 of the electric machine assembly 100. The flow of fluid 76 enters through the first strut 115 and through the cooling passage 115 in thermal proximity to the electric machine 120. The flow of fluid 76 provides cooling to the electric machine assembly 100 such as by carrying thermal energy generated from the electric machine 120. The flow of fluid 76 then egresses through the second strut 117.

Referring still to FIG. 1, the flow of fluid 76 may further egress from the cooling passage 115 and the second strut 117 to one or more conduits 55 providing fluid communication from the electric machine assembly 100 to the combustor assembly 50. The heated fluid 76, such as defining fuel, is then provided to the combustor assembly 50 and egressed into the primary flowpath 105 for combustion with the compressed air 72 to yield combustion gases 74.

In an embodiment in which the fluid system 130 defines a fuel system providing fuel to the combustor assembly 50, efficiency of the engine 10 and the combustor assembly 50 may further be improved by reducing viscosity of the fuel, thereby promoting fuel atomization with the compressed air 72 for combustion. Improved fuel atomization may reduce emissions, improve fuel burn, promote combustion stability, and improve pattern factor.

Referring now to FIG. 4, the engine 10 may be configured substantially similarly as shown and described in regard to FIGS. 1-3. However, in FIG. 4, the fluid system 130 may define an oil or lube system providing oil or other lubricant to one or more of a gear assembly for the fan or propeller assembly 30 or one or more bearing assemblies 80 of the compressor section 25 or the turbine section 75. The fluid system 130 may provide the flow of fluid 76, such as defining oil or another lubricant, through the cooling passage 115 of the electric machine assembly 100. The flow of fluid 76 may capture thermal energy from the electric machine 120 such as described in regard to FIGS. 1-3. The flow of fluid 76 may further egress from the electric machine assembly 100 to one or more bearing assemblies 80 at the compressor section 25, the turbine section 75, or both. The engine 10 may further include the conduit 55 extended from the electric machine assembly 100 to the turbine section 75, providing fluid communication of the fluid 76 to one or more bearing assemblies 80 at the turbine section 75.

In an embodiment in which the fluid system 130 defines an oil or lube system providing oil or lubricant to one or more bearing assemblies 80, efficiency of the engine 10 may be further improved by integrating the electric machine assembly 100 to a fluids thermal management system of the engine 10, such as regulating a temperature of the oil or lubricant to one or more bearing assemblies 80.

Referring now to FIG. 5, the engine 10 may be configured substantially similarly as shown and described in regard to FIGS. 1-4. However, in FIG. 5, the fluid system 130 may define a pneumatic fluid system deriving the fluid 76 from the compressor section 25. For example, the fluid system 130 may define a walled manifold coupled to the compressor section 25 and in fluid communication from the primary flowpath 105. The fluid system 130 extracts a portion of the compressed air 72 from the primary flowpath 105 and directs the fluid, shown schematically as arrows 76 within the fluid system 130, to the housing 110. The fluid 76, such as a portion of the compressed air 72, is directed through the cooling passage 115 such as described in regard to FIGS. 1-3.

In the embodiment generally provided in FIG. 5, the cooling passage 115 is in fluid communication with a conduit 55 coupled to the housing 110 and the turbine section 75. In the embodiment generally provided in FIG. 5, the conduit 55 directs the flow of fluid 76, as compressed air, from the housing 110 to the turbine section 75. In various embodiments, the fluid 76 is utilized at the turbine section 75 for cooling of turbine blades, vanes, shrouds, hubs, disks, etc. In another embodiment, the fluid 76 is utilized at the turbine section 75 for active clearance control (ACC). In still another embodiment, the fluid 76 is directed to one or more bearing assemblies 80 at the turbine section 75. In such an embodiment, the fluid 76 may provide air for an air bearing assembly, for pressurization or buffering of the bearing assembly 80, for cooling, or combinations thereof.

Referring now to FIG. 6, the engine 10 may be configured substantially similarly as shown and described in regard to FIGS. 1-5. More specifically, the engine 10 may be configured substantially similarly as shown and described in regard to FIG. 5, such as the fluid system 130 defining a pneumatic fluid system deriving the fluid 76 from the compressor section 25. However, in FIG. 6, the second strut 117 defines an exit opening 118 at the cooling passage 115 in fluid communication with the primary flowpath 105. As such, the engine 10 extracts a portion of the compressed air 72 from the primary flowpath 105 and directs the fluid, shown schematically as arrows 76 within the fluid system 130, to the housing 110. The fluid 76, such as a portion of the compressed air 72, is directed through the cooling passage 115. The fluid 76 is then egressed into the primary flowpath 105 and mixed with the fluid 70.

Referring now to FIG. 7, the engine 10 may be configured substantially similarly as shown and described in regard to FIGS. 1-6. More specifically, the engine 10 may be configured to flow air as the fluid 76 through the cooling passage 115. For example, the first strut 113 may define an inlet opening 116 in fluid communication with the cooling passage 115 defined through the first strut 113. The inlet opening 116 directs to the cooling passage 115 a portion of the flow of air 70 entering the engine 10 through the engine inlet 20. In various embodiments, the inlet opening 116 is in fluid communication with the primary flowpath 105. In other embodiments, the inlet opening 116 is approximately coplanar with the engine inlet 20, such as in fluid communication with an ambient air outside the engine 10. For example, a portion of the flow of air 70 may enter the engine 10 and pass across or around the first strut 117 to flow through the primary flowpath 105. Another portion of the flow of air 70 may enter the engine 10 and enter the cooling passage 115 through the first strut 117 as the fluid 76. The fluid 76 may flow through the cooling passage 115 and egress into the primary flowpath 105.

Referring now to FIG. 8, the engine 10 may be configured substantially similarly as shown and described in regard to FIGS. 1-7. More specifically, the engine 10 may be configured to flow air as the fluid 76 through the cooling passage 115. However, in the embodiment generally provided in FIG. 8, the inlet opening 116 and the exit opening 118 are each defined through an inner radius of the primary flowpath 105 defined by the housing 110. Similarly as described in regard to FIG. 7, the inlet opening directs to the cooling passage 115 a portion of the flow of air 70 entering the engine 10 through the engine inlet 20. It should be appreciated that in other embodiments, the engine 10 may define the inlet opening 116 through a face or portion of the engine 10, or more specifically, the housing 110, similarly as defined at the engine inlet 20. For example, the inlet opening 116 may be defined such as to provide the cooling passage 115 as a secondary flowpath adjacent to the primary flowpath 105 and in fluid communication at the exit opening 118.

It should be appreciated that in other embodiments the fluid system 130 may provide a flow of oil, lubricant, hydraulic fluid, pneumatic fluid, or fuel to one or more other systems, components, or subassemblies, such as, but not limited to, seals, dampers, actuators, reservoirs, gear assemblies, or heat exchangers.

In various embodiments, the cooling passage 115 may define a generally constant cross sectional area therethrough. In other embodiments, the cooling passage 115 may define different cross sectional areas, such as decreasing and increasing or converging and diverging, such as to alter the velocity and/or pressure of the fluid 76 through the cooling passage 115. For example, referring to FIG. 7, a portion of the cooling passage 115 defines a converging/diverging portion 125 proximate to the electric machine 120. The converging/diverging portion 125 may generally decrease the rate of flow of fluid 76 through the cooling passage 115 such as to increase a period of time the fluid 76 is proximate to the electric machine 120. Altering the rate of flow of fluid 76 through the cooling passage 115 may enable the fluid 76 to further transfer heat from the electric machine 120 to the fluid 76 as the fluid passes through the cooling passage 115. It should be appreciated that although the converging/diverging portion 125 is shown in regard to the embodiment generally provided in FIG. 7, the converging/diverging portion 125 may be applied to embodiments generally provided in FIGS. 1-6.

Referring now to FIGS. 9A and 9B, an exemplary flowchart outlining steps of a method of fluid cooling for an electric machine of a gas turbine engine is generally provided (hereinafter, "method 1000"). The method 1000 may be utilized or executed in a gas turbine engine including an electric machine assembly such as described in regard to FIGS. 1-8.

The method 1000 includes at 1010 positioning an electric machine within a housing defining a cooling passage in which the cooling passage circumferentially surrounds the electric machine and is extended at least partially along a lengthwise direction of the electric machine. For example, the electric machine may be positioned radially within the housing and the cooling passage extended circumferentially through the housing and around the electric machine, such as shown and described in regard to the embodiments of the engine 10 and electric machine assembly 100 in FIGS. 1-8.

The method 1000 further includes at 1020 flowing a first fluid through the cooling passage such that the fluid approximately circumferentially surrounds the electric machine along the lengthwise direction within the housing. Flowing the first fluid through the cooling passage is performed such that the first fluid transfers thermal energy from the electric machine to the first fluid. In various embodiments, the first fluid is one or more of a liquid or gaseous fluid, including, but not limited to, a fuel, oil or another lubricant, a hydraulic fluid, and a pneumatic fluid.

In one embodiment, the method 1000 further includes at 1022 flowing the first fluid from the cooling passage to a combustion section of the core engine. For example, where the first fluid defines a fuel, flowing the first fluid from the cooling passage to the combustor assembly (e.g., the combustor assembly 50) of the engine may improve viscosity of the fuel, thereby improving fuel atomization and mixing with a compressed air of at the combustor assembly, altogether improving engine efficiency and performance.

In another embodiment, the method 1000 further includes at 1023 flowing the first fluid from the cooling passage to a cooling system of the engine. The cooling system may be defined at the turbine section, such as to provide cooling fluid to one or more static or rotating turbine components. In various embodiments, the cooling system may further define an active clearance control (ACC) system of the turbine section.

In yet another embodiment, the method 1000 further includes at 1024 flowing the first fluid from the cooling passage to a bearing assembly of the engine. For example, wherein the first fluid defines an oil or lubricant, flowing the first fluid from the cooling passage to a bearing assembly and/or a seal assembly at the compressor section or the turbine section may improve engine efficiency by enabling reduced packaging and simplicity of the lube system, thermal management system, or both.

The method 1000 may further include at 1030 flowing a second fluid through a primary flowpath defined through and in fluid communication with the housing and a core engine of the gas turbine engine. The core engine is in direct fluid communication from the primary flowpath at the housing (e.g., such as shown and described in regard to FIGS. 1-8). The primary flowpath at least partially circumferentially surrounds the electric machine outward along the radial direction of the cooling passage. Flowing the second fluid through the primary flowpath transfers thermal energy from the first fluid to the second fluid. The second fluid may generally define an oxidizer, such as air, used for combustion at the engine.

In one embodiment, the method 1000 further includes at 1032 flowing the second fluid in direct fluid communication from the housing to a compressor section of the engine; and at 1034 generating an increase in temperature of the second fluid based on the transfer of thermal energy from the electric machine. As previously described in regard to FIGS. 1-8, although flowing the second fluid in direct fluid communication from the housing to the compressor section may generally decrease aerodynamic efficiency and performance of the compressor section by increasing the temperature of the flow of second fluid (e.g., fluid 76) entering the compressor section, providing thermal communication of the second fluid with the first fluid to improve efficiency and performance of the electric machine may generally result in an efficiency and performance improvement greater than a decrease in losses thereof at the compressor section.

In another embodiment, the method 1000 may further include at 1033 flowing the second fluid in direct fluid communication from the compressor section of the engine to a fluid system, such as generally provided in regard to FIG. 5. For example, flowing the second fluid to the fluid system may further include flowing the second fluid from the fluid system to the cooling passage as the first fluid. In various embodiments, the method 1000 may further include flowing the first fluid into the primary flowpath to mix with the second fluid.

In various embodiments, the method 1000 may further include at 1036 determining a maximum allowable thermal energy transfer from the first fluid to the second fluid based on a maximum allowable air temperature at an inlet of the compressor section at one or more engine operating conditions. For example, the step at 1036 may define a maximum loss of efficiency at the compressor section resulting from the increase in temperature of the second fluid as measured at the inlet of the compressor section (e.g., compressor inlet 27). Determining the maximum allowable air temperature may be a function of one or more of a rate of flow of the second fluid through the primary flowpath, an inlet temperature of the second fluid at an inlet of the housing (e.g., engine inlet 20), an ambient temperature of air from which the second fluid is from, and a viscosity, density, pressure, and heat transfer coefficient of the second fluid.

The method 1000 may further include at 1038 determining a maximum allowable thermal energy transfer from the electric machine to the first fluid based on the maximum allowable fuel temperature at the combustor assembly. Determining the maximum allowable thermal energy transfer may be a function of one or more of a rate of flow of the first fluid through the cooling passage (e.g., cooling passage 115), an inlet temperature of the first fluid (e.g., at the upstream end 99), a maximum allowable exit temperature of the first fluid (e.g., at the downstream end 98), a viscosity, density, pressure, or heat transfer coefficient of the first fluid.

In various embodiments, determining the maximum allowable thermal energy transfer may further be a function of a material type and heat transfer coefficient of the housing (e.g., housing 110 through which the cooling passage 115 is defined; a cross sectional area of the cooling passage; an overall volume of the cooling passage; a distance of the cooling passage relative to the electric machine; and an overall area or volume of the first fluid proximate to the electric machine (e.g., such as defined by an average distance of the cooling passage to the electric machine). As such, the method 1000 may further include at 1040 positioning the cooling passage within the housing based on the maximum allowable thermal energy transfer from the first fluid to the second fluid.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine, comprising:
a housing circumferentially surrounding an electric machine, wherein the housing supports the electric machine therewithin,
the housing defining a cooling passage proximate to the electric machine, wherein the cooling passage circumferentially surrounds the electric machine and is extended at least partially along a lengthwise direction of the electric machine,
the cooling passage providing from an upstream inlet to a downstream outlet a flow of fluid therethrough,
the upstream inlet being forward of the downstream outlet with respect to a serial flow arrangement of the gas turbine engine, and
the housing defining a primary flowpath in fluid communication with a core engine, the housing defining an inlet of the primary flowpath upstream of the electric machine, wherein the primary flowpath at least partially circumferentially surrounds the electric machine and is disposed outward along a radial direction of the cooling passage, wherein the cooling passage is radially outward of the electric machine between the upstream inlet and the downstream outlet.

2. The gas turbine engine of claim 1, wherein the cooling passage defines a circumferential passage extended at least partially circumferentially around the electric machine at an upstream end and at a downstream end, wherein the cooling passage defines an axial passage extended between each circumferential passage.

3. The gas turbine engine of claim 1, wherein the primary flowpath is extended along the lengthwise direction of the housing and the electric machine.

4. The gas turbine engine of claim 1, wherein the primary flowpath is defined through the housing and the core engine comprising a compressor section, a combustion section, and a turbine section in serial flow arrangement, wherein a second flow of fluid through the primary flowpath at the housing and the core engine is in thermal communication with the electric machine.

5. The gas turbine engine of claim 1, wherein the cooling passage is defined as a plurality of axial passages in adjacent circumferential arrangement around the electric machine, wherein each axial passage is extended along the lengthwise direction.

6. The gas turbine engine of claim 1, wherein the housing defines a strut, wherein the strut is extended at least partially along a radial direction outward of the electric machine, and wherein the cooling passage is extended through the strut.

7. The gas turbine engine of claim 6, wherein the housing defines the upstream inlet in fluid communication with the cooling passage through which a portion of a flow of fluid enters the cooling passage.

8. The gas turbine engine of claim 6, wherein the strut defines the downstream outlet in fluid communication with the cooling passage.

9. The gas turbine engine of claim 8, wherein the downstream outlet is further in fluid communication with a turbine section of the gas turbine engine.

10. The gas turbine engine of claim 1, further comprising:
a fluid system providing a flow of fluid to the cooling passage.

11. The gas turbine engine of claim 9, further comprising:
a conduit extended from the strut in fluid communication with the cooling passage.

12. The gas turbine engine of claim 11, wherein the conduit is further coupled to the turbine section in fluid communication with the cooling passage, the conduit providing the flow of fluid from the cooling passage to the turbine section.

13. The gas turbine engine of claim 1, wherein the flow of fluid is one or more of air, liquid or gaseous fuel, oil, hydraulic fluid, an inert gas, or combinations thereof.

14. A method of fluid cooling for an electric machine of a gas turbine engine, the method comprising:
   positioning the electric machine within a housing circumferentially surrounding the electric machine and supporting the electric machine therewithin, the housing defining a cooling passage proximate to the electric machine, wherein the cooling passage circumferentially surrounds the electric machine and is extended at least partially along a lengthwise direction of the electric machine;
   flowing a first fluid through the cooling passage such that the fluid at least partially circumferentially surrounds the electric machine along the lengthwise direction within the housing, wherein flowing the first fluid through the cooling passage from an upstream inlet to a downstream outlet transfers thermal energy from the electric machine to the first fluid, the upstream inlet being forward of the downstream outlet with respect to a serial flow arrangement of the gas turbine engine; and
   flowing a second fluid through a primary flowpath defined through and in fluid communication with the housing and a core engine of the gas turbine engine, the housing defining an inlet of the primary flowpath upstream of the electric machine, the primary flowpath at least partially circumferentially surrounding the electric machine outward along the radial direction of the cooling passage, the cooling passage being radially outward of the electric machine between the upstream inlet and the downstream outlet, and wherein flowing the second fluid through the primary flowpath transfers thermal energy from the first fluid to the second fluid.

15. The method of claim 14, further comprising:
   flowing the second fluid in direct fluid communication from the housing to a compressor section of the engine.

16. The method of claim 14, further comprising:
   generating an increase in temperature of the second fluid based on the transfer of thermal energy from the electric machine.

17. The method of claim 14, further comprising:
   determining a maximum allowable thermal energy transfer from the first fluid to the second fluid based on a maximum allowable air temperature at an inlet of the compressor section at one or more engine operating conditions.

18. The gas turbine engine of claim 1, further comprising:
   a fluid system providing a flow of oil or other lubricant to the cooling passage.

19. The gas turbine engine of claim 18, wherein the flow of oil or other lubricant exits at a turbine section of the gas turbine engine.

20. The gas turbine engine of claim 19, wherein the flow of oil or other lubricant exits at one or more bearing assemblies of the turbine section.

* * * * *